(12) United States Patent
Merchant et al.

(10) Patent No.: US 10,670,018 B2
(45) Date of Patent: Jun. 2, 2020

(54) LIQUID INJECTION APPARATUS AND COMPRESSOR ASSEMBLY HAVING THE SAME

(71) Applicant: General Electric Company, Schenectady, NY (US)

(72) Inventors: Laxmikant Merchant, Karnataka (IN); Valery Ivanovich Ponyavin, Greenville, SC (US); Jeffrey Patrick Mills, Greenville, SC (US); Divya Reddy Kothakapu, Karnataka (IN); Weilun Yu, Greenville, SC (US); Joshua Adam Bagwell, Taylors, SC (US)

(73) Assignee: General Electric Company, Schenectady, NY (US)

( * ) Notice: Subject to any disclaimer, the term of this patent is extended or adjusted under 35 U.S.C. 154(b) by 445 days.

(21) Appl. No.: 15/584,558

(22) Filed: May 2, 2017

(65) Prior Publication Data
US 2017/0321700 A1    Nov. 9, 2017

(30) Foreign Application Priority Data
May 3, 2016    (IN) .............................. 201641015301

(51) Int. Cl.
*F04C 29/12*    (2006.01)
*F02C 3/30*    (2006.01)
(Continued)

(52) U.S. Cl.
CPC ................ *F04C 29/12* (2013.01); *F02C 3/30* (2013.01); *F02C 7/04* (2013.01); *F02C 7/1435* (2013.01);
(Continued)

(58) Field of Classification Search
CPC ...... F02C 3/30; F02C 7/04; F02C 7/143; F02C 7/1435; F04C 29/12; F05D 2230/51
See application file for complete search history.

(56) References Cited

U.S. PATENT DOCUMENTS 5,930,990 A     8/1999  Zachary et al.
6,553,768 B1    4/2003  Trewin et al.
(Continued)

FOREIGN PATENT DOCUMENTS

EP    2 562 393 A2    2/2013
EP      2573365 A2    3/2013

OTHER PUBLICATIONS

Extended European Search Report and Opinion issued in connection with corresponding EP Application No. 17168343.6 dated Feb. 13, 2018.

(Continued)

*Primary Examiner* — Arun Goyal
*Assistant Examiner* — Colin J Paulauskas
(74) *Attorney, Agent, or Firm* — Armstrong Teasdale LLP

(57) ABSTRACT

A liquid injection apparatus for use with a compressor having a rotor shaft and a casing part is provided. The liquid injection apparatus includes at least one conduit and at least one nozzle coupled to the conduit(s). The liquid injection apparatus is panel-shaped and has a first panel segment, a second panel segment, and at least one of: a passage defined between the first panel segment and the second panel segment, the passage sized to receive at least one of the rotor shaft and the casing part; and a third panel segment positioned between the first panel segment and the second panel segment. The third panel segment is at least in part detachable from the first panel segment and/or the second panel (Continued)

segment for receiving at least one of the rotor shaft and the casing part between the first panel segment and the second panel segment.

11 Claims, 8 Drawing Sheets

(51) Int. Cl.
  *F02C 7/143* (2006.01)
  *F02C 7/04* (2006.01)
  *F04C 29/02* (2006.01)
  *F04C 29/04* (2006.01)

(52) U.S. Cl.
  CPC .............. *F04C 29/02* (2013.01); *F04C 29/04* (2013.01); *F05D 2230/51* (2013.01)

(56) References Cited

U.S. PATENT DOCUMENTS

| | | | |
|---|---|---|---|
| 7,353,656 | B2 | 4/2008 | Bolis et al. |
| 7,712,301 | B1 | 5/2010 | Wagner et al. |
| 8,475,117 | B2 | 7/2013 | Andrew et al. |
| 2002/0083712 | A1 | 7/2002 | Tomlinson et al. |
| 2005/0102995 | A1 | 5/2005 | Carberg et al. |
| 2008/0060359 | A1* | 3/2008 | Eadon ................ F02C 3/30 60/740 |
| 2008/0250769 | A1* | 10/2008 | Wagner ............... F01D 25/002 60/39.24 |
| 2009/0320440 | A1 | 12/2009 | Erickson et al. |
| 2011/0042836 | A1 | 2/2011 | Zhang et al. |

OTHER PUBLICATIONS

Partial European Search Report and Opinion issued in connection with corresponding EP Application No. 17168343.6 dated Sep. 26, 2017.

* cited by examiner

LIQUID INJECTION APPARATUS AND COMPRESSOR ASSEMBLY HAVING THE SAME

CROSS REFERENCE TO RELATED APPLICATIONS

This application claims priority to Indian Patent Application Serial No. 2016/41015301, filed May 3, 2016, entitled "LIQUID INJECTION APPARTATUS AND COMPRESSOR ASSEMBLY HAVING THE SAME," which is hereby incorporated by reference in its entirety.

BACKGROUND

The field of this disclosure relates generally to a liquid injection apparatus and, more particularly, to a liquid injection apparatus for use with a compressor.

Many known power plants have a generator and a turbine assembly coupled to the generator for powering the generator. The turbine assembly typically includes a compressor, a combustor, and a turbine that are coupled together in fluid communication. The compressor has a casing and a rotor positioned within the casing, such that a gas channeled into the compressor is compressed by the rotor. The compressed gas is channeled into the combustor, in which the compressed gas is mixed with fuel and ignited to generate combustion gases. The combustion gases are channeled into the turbine, causing the turbine to rotate and drive a shaft coupled to the generator.

At least some known turbine assemblies have an inlet housing for channeling a working gas into the compressor via a duct of the inlet housing. An apparatus is sometimes coupled within the duct for injecting a liquid into the gas flow through the duct before the flow enters the compressor. However, in some circumstances, the apparatus may obstruct access to other components of the turbine assembly during a maintenance procedure, and it can be time consuming and costly to remove the entire apparatus from the duct for accessing such component(s).

BRIEF DESCRIPTION

In one aspect, a liquid injection apparatus for use with a compressor having a rotor shaft and a casing part is provided. The liquid injection apparatus includes at least one conduit and at least one nozzle coupled to the at least one conduit. The liquid injection apparatus is panel-shaped and has a first panel segment, a second panel segment, and at least one of: a passage defined between the first panel segment and the second panel segment, the passage sized to receive at least one of the rotor shaft and the casing part; and a third panel segment positioned between the first panel segment and the second panel segment. The third panel segment is at least in part detachable from at least one of the first panel segment and the second panel segment for receiving at least one of the rotor shaft and the casing part between the first panel segment and the second panel segment.

In another aspect, a compressor assembly is provided. The compressor assembly includes a casing having a part, and a rotor coupled within the casing. The rotor includes a rotor shaft. The compressor assembly also includes an inlet housing coupled to the casing such that the rotor shaft extends into the inlet housing. The inlet housing defines a flow path into the casing and includes a liquid injection apparatus coupled within the flow path. The liquid injection apparatus has at least one conduit and at least one nozzle coupled to the at least one conduit. The liquid injection apparatus is panel-shaped and has a first panel segment, a second panel segment, and at least one of: a passage defined between the first panel segment and the second panel segment, the passage sized to receive at least one of the rotor shaft and the casing part; and a third panel segment positioned between the first panel segment and the second panel segment. The third panel segment is at least in part detachable from at least one of the first panel segment and the second panel segment for receiving at least one of the rotor shaft and the casing part between the first panel segment and the second panel segment.

In another aspect, a compressor assembly is provided. The compressor assembly includes a casing, and a rotor coupled within the casing. The rotor includes a rotor shaft. The compressor assembly also includes an inlet housing coupled to the casing such that the rotor shaft extends into the inlet housing. The inlet housing includes a duct having at least one panel that defines a flow path into the casing. The inlet housing also includes a liquid injection apparatus including a plurality of nozzles mounted on the at least one panel within the flow path.

DETAILED DESCRIPTION

The following detailed description illustrates a liquid injection apparatus by way of example and not by way of limitation. The description should enable one of ordinary skill in the art to make and use the apparatus, and the description describes several embodiments of the apparatus, including what is presently believed to be the best modes of making and using the apparatus. Exemplary apparatuses are described herein as being useful with a compressor of a turbine assembly. However, it is contemplated that the apparatuses have general application to a broad range of systems in a variety of fields other than compressors and/or turbine assemblies.

Figure 1:
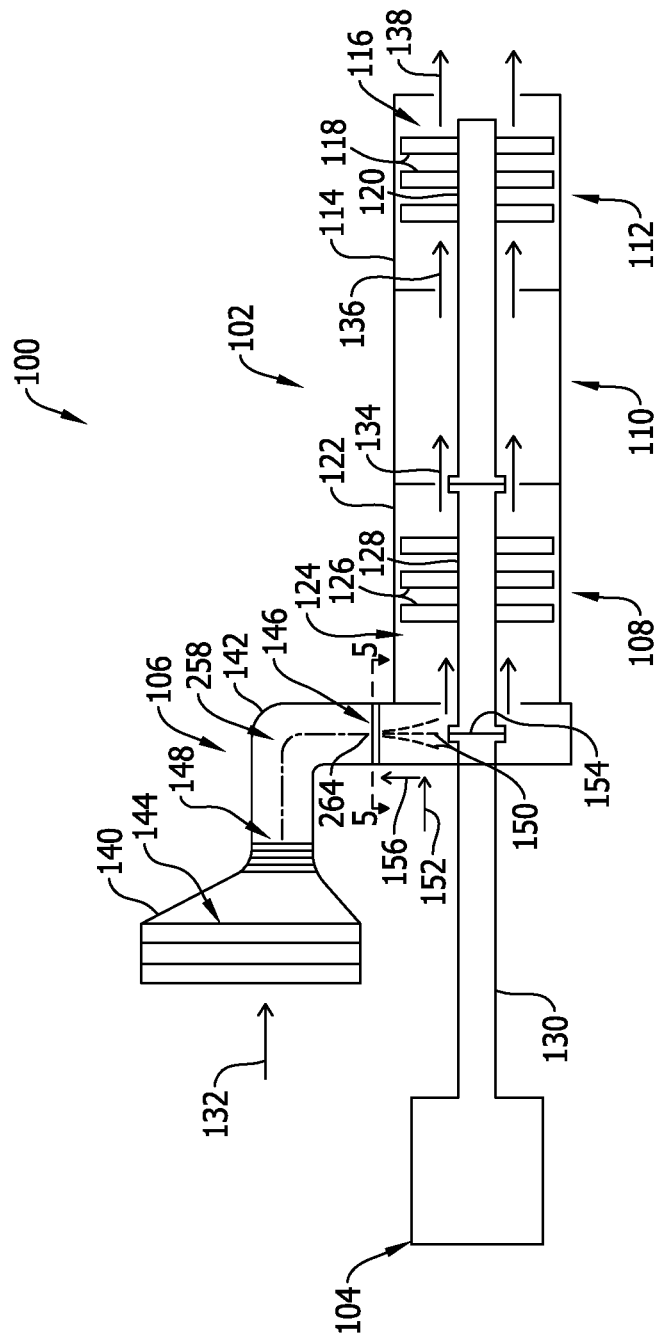
FIG. 1 is a schematic illustration of an exemplary power plant.

FIG. 1 is a schematic illustration of an exemplary power plant 100. In the exemplary embodiment, power plant 100 includes a turbine assembly 102 and a generator 104 coupled to turbine assembly 102. Turbine assembly 102 includes a compressor inlet housing 106, a compressor 108, a combustor 110, and a turbine 112 coupled in serial fluid communication with one another. Turbine 112 has a casing 114 and a rotor 116 coupled within casing 114, and rotor 116 includes a plurality of blades 118 coupled to a shaft 120. Similarly, compressor 108 has a casing 122 and a rotor 124 coupled within casing 122, and rotor 124 includes plurality of blades 126 coupled to a shaft 128. Turbine rotor shaft 120 extends through at least a portion of combustor 110 for coupling to compressor rotor shaft 128, and compressor rotor shaft 128 extends through at least a portion of inlet housing 106 for coupling to a drive shaft 130 of generator 104. In other embodiments, turbine assembly 102 may have any suitable components arranged and coupled to generator 104 in any suitable manner that facilitates enabling inlet housing 106 to function as described herein.

During operation of power plant 100, a working gas 132 (e.g., ambient air) flows through inlet housing 106 and into compressor 108, wherein working gas 132 is compressed by compressor rotor blades 126. A compressed gas 134 is then discharged from compressor 108 into combustor 110, in which the compressed gas 134 is mixed with fuel and ignited. Combustion gases 136 are then discharged from combustor 110 into turbine 112, in which combustion gases 136 drive turbine rotor blades 118 and, hence, turbine rotor shaft 120. Turbine rotor shaft 120 drives compressor rotor shaft 128 which, in turn, drives generator drive shaft 130 to operate generator 104. After combustion gases 136 flow through turbine 112, combustion gases 136 are discharged as exhaust 138.

In the exemplary embodiment, inlet housing 106 includes a mouth 140 and a duct 142 that is coupled in fluid communication between mouth 140 and compressor casing 122. Inlet housing 106 also includes a filter assembly 144 mounted within mouth 140, a liquid injection apparatus 146 mounted within duct 142 above compressor rotor shaft 128, and a baffle assembly 148 mounted within duct 142 between mouth 140 and apparatus 146. Baffle assembly 148 mitigates the echoing of sound from compressor 108 into the ambient via duct 142 and mouth 140 of inlet housing 106. Filter assembly 144 removes particulate matter suspended in working gas 132, and apparatus 146 injects a liquid 150 into working gas 132 before working gas 132 enters compressor 108. By injecting liquid 150 into working gas 132, an increase in the overall power output of turbine assembly 102 can be experienced. In other embodiments, inlet housing 106 may not include filter assembly 144 and/or baffle assembly 148, and apparatus 146 may be mounted at any suitable location within duct 142.

Figure 2:
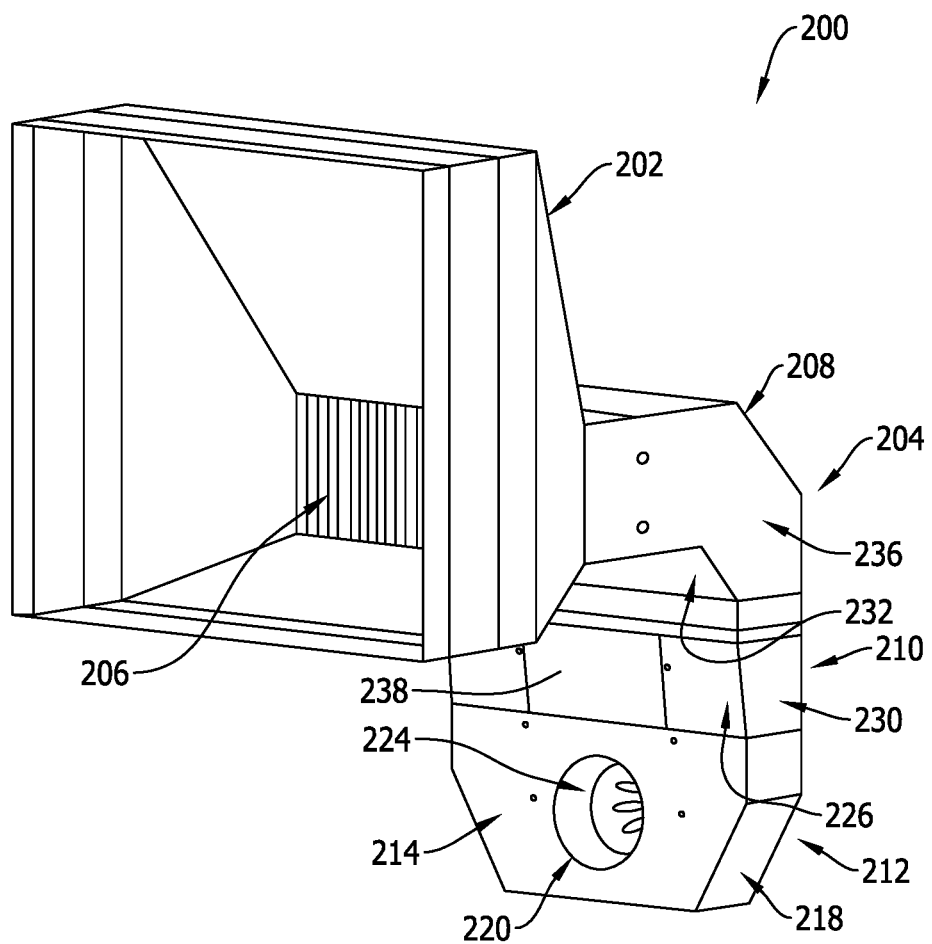
FIG. 2 is a front perspective view of an exemplary inlet housing for use in the power plant shown in FIG. 1.
Figure 3:
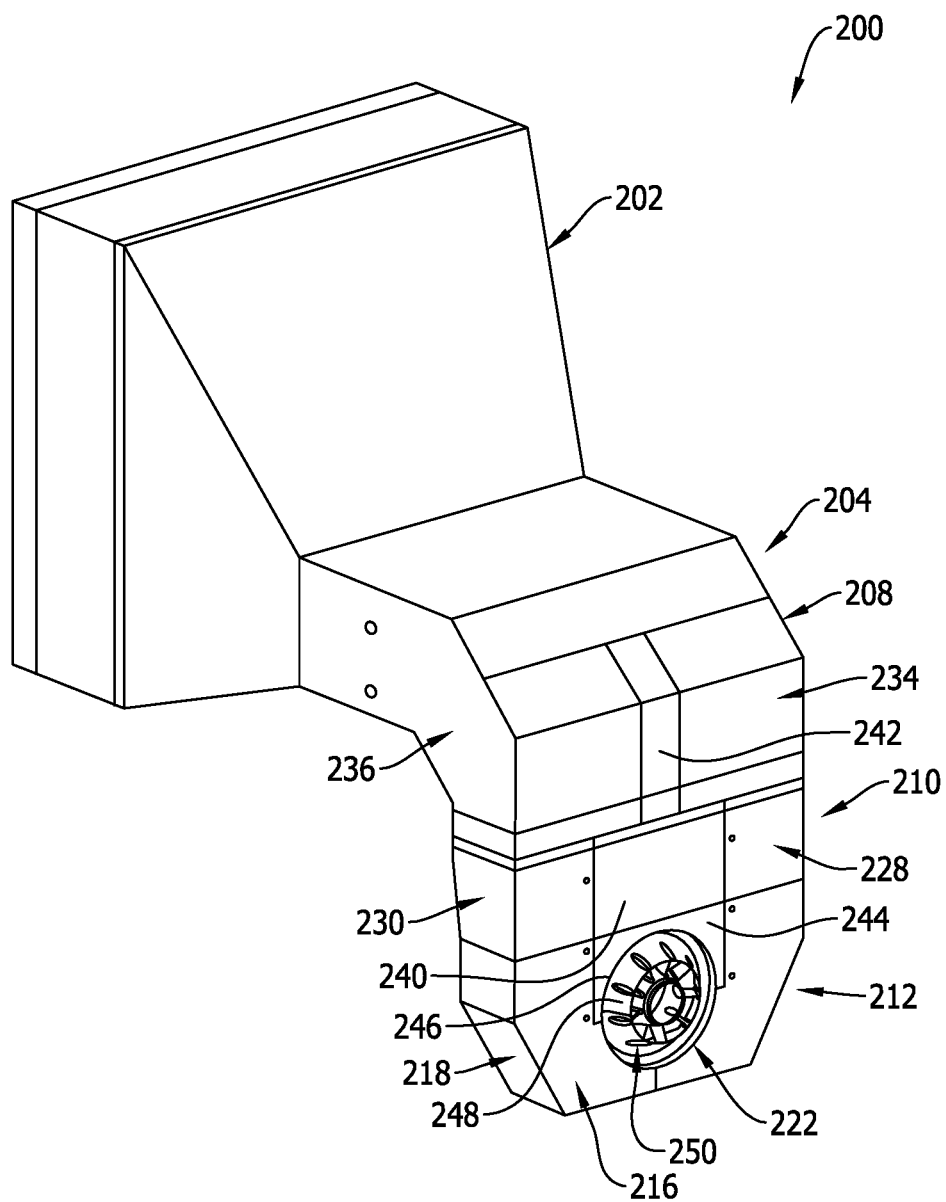
FIG. 3 is a rear perspective view of the inlet housing shown in FIG. 2.

FIGS. 2 and 3 are front and rear perspective views, respectively, of an exemplary compressor inlet housing 200 for use in power plant 100. In the exemplary embodiment, inlet housing 200 includes a mouth 202, a duct 204 coupled to mouth 202, and a baffle assembly 206 mounted within duct 204. Mouth 202 is sized larger than duct 204 and is designed to receive a filter assembly (not shown) therein. Duct 204 has an elbow section 208 coupled to mouth 202, a transition section 210 coupled to elbow section 208, and a plenum section 212 coupled to transition section 210. Plenum section 212 has a front panel assembly 214, a rear panel assembly 216, and a pair of side panel assemblies 218 extending between front panel assembly 214 and rear panel assembly 216. Front panel assembly 214 and rear panel assembly 216 have respective front and rear openings 220 and 222 that define a shaft passage 224 through plenum section 212, and shaft passage 224 is sized to receive compressor rotor shaft 128 (shown in FIG. 1). Moreover, transition section 210 has a front panel assembly 226, a rear panel assembly 228, and a pair of side panel assemblies 230, and elbow section 208 likewise has a front panel assembly 232, a rear panel assembly 234, and a pair of side panel assemblies 236.

To facilitate accessing the interior of duct 204 when, for example, removing compressor rotor 124 and/or part of compressor casing 122 (e.g., for routine maintenance) as described in more detail below, front panel assembly 226 of transition section 210 has at least one detachable front panel 238, and rear panel assembly 228 of transition section 210 likewise has at least one detachable rear panel 240. Rear panel assembly 234 of elbow section 208 also has at least one detachable rear panel 242 above transition section rear panel(s) 240, and rear panel assembly 216 of plenum section 212 likewise has at least one detachable rear panel 244 below transition section rear panel(s) 240. Plenum section rear panel(s) 244 define at least an upper peripheral edge 246 of rear opening 222 about a detachable upper part 248 of a rotor shaft casing 250, which is positioned within rear opening 222 and is a constituent part of compressor casing 122 and/or inlet housing 200. Although elbow section rear panel(s) 242 are illustrated as being narrower than transition section rear panel(s) 240 in the exemplary embodiment, elbow section rear panel(s) 242 may have any suitable size and shape relative to transition section rear panel(s) 240 in other embodiments.

Figure 4:
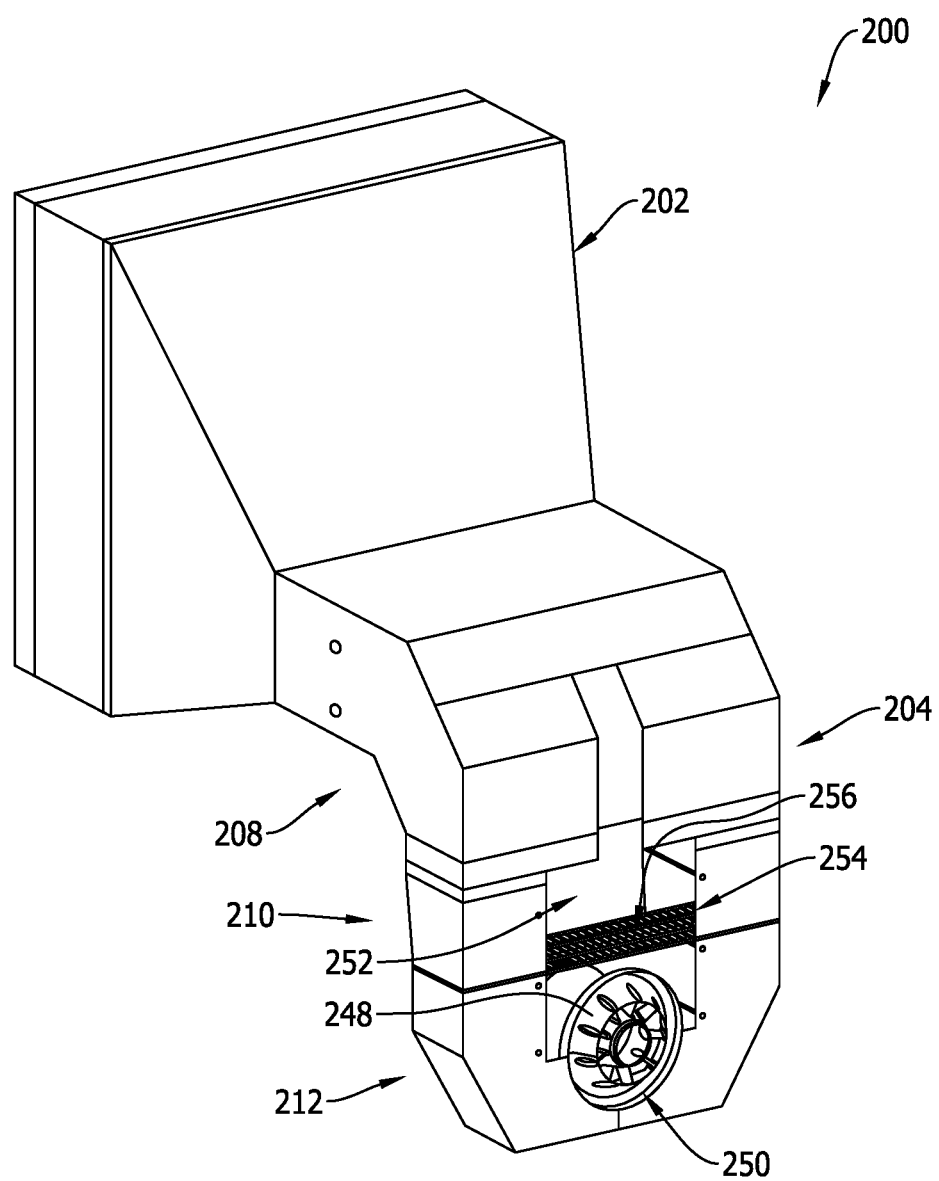
FIG. 4 is a rear perspective view of the inlet housing shown in FIG. 3 with front and rear panels removed.

FIG. 4 is a rear perspective view of inlet housing 200 with front and rear panels 238, 240, 242, and 244 removed. In the exemplary embodiment, when front and rear panels 238, 240, 242, and 244 are removed, a front aperture 252 is defined in front panel assembly 226, and a rear aperture 254 is defined in rear panel assemblies 216, 228, and 234. As set forth in more detail below, a liquid injection apparatus 256 of inlet housing 200 is thereby accessible via front aperture 252 and/or rear aperture 254 to facilitate displacing and/or detaching part of apparatus 256 to enable component(s) of compressor 108 (e.g., compressor rotor 124 and/or part of compressor casing 122) to be lifted above apparatus 256 along duct 204 via rear aperture 254 when upper part 248 of rotor shaft casing 250 is detached.

Figure 5:
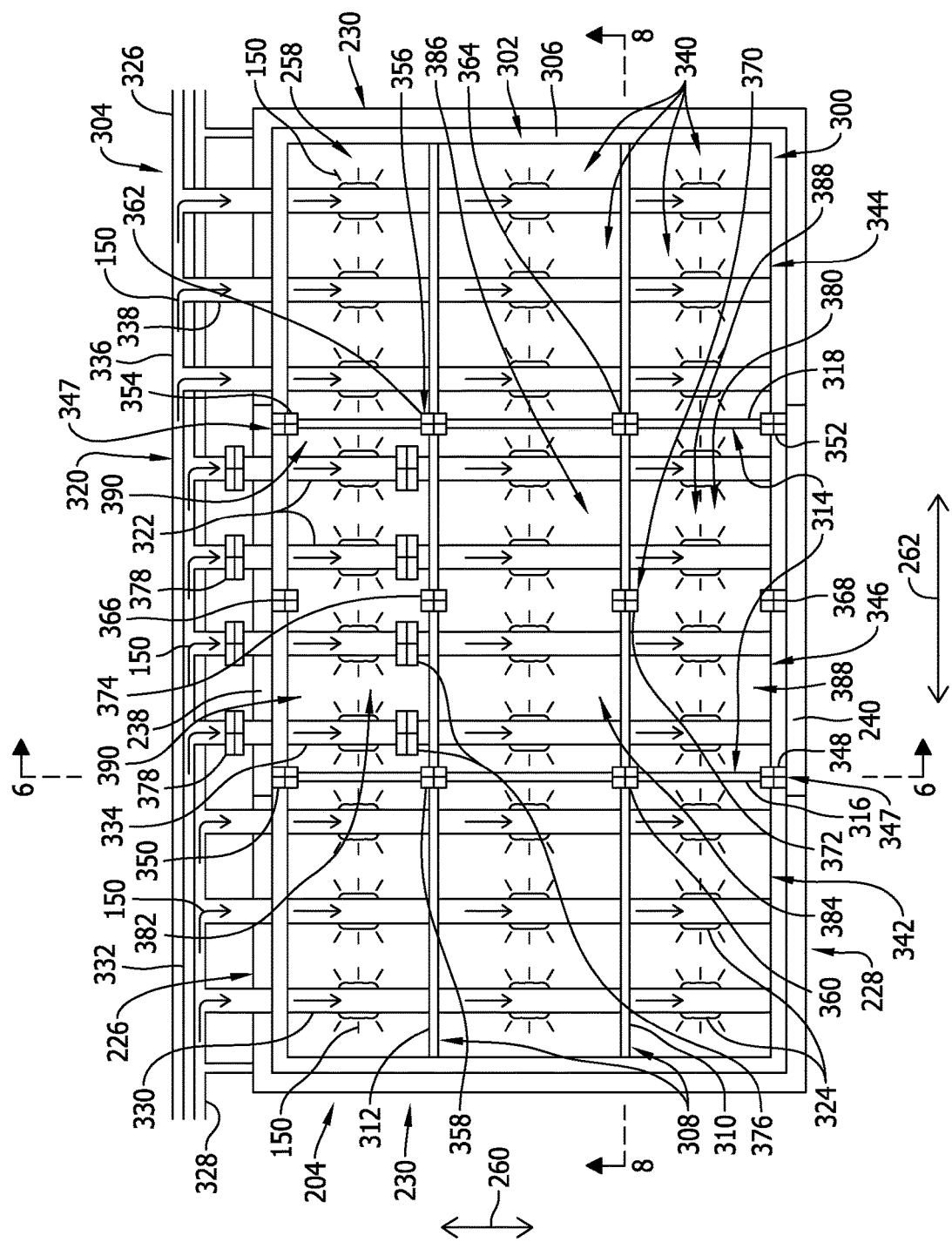
FIG. 5 is a schematic cross-sectional illustration of an exemplary liquid injection apparatus mounted within the inlet housing shown in FIG. 2 and taken along plane 5-5 of FIG. 1 when the inlet housing is used in the power plant shown in FIG. 1.

FIG. 5 is a schematic cross-sectional illustration of an exemplary liquid injection apparatus 300 mounted within inlet housing 200 and taken along plane 5-5 of FIG. 1 when inlet housing 200 is used in power plant 100. In the exemplary embodiment, duct 204 defines a flow path 258 (also shown in FIG. 1) having a substantially rectangular cross-section with a lateral (e.g., shorter) dimension 260 and a longitudinal (e.g., longer) dimension 262. Apparatus 300 is a panel-shaped structure that, when mounted within duct 204, is oriented substantially perpendicular to a lengthwise axis 264 (shown in FIG. 1) of flow path 258. More specifically, in the exemplary embodiment, apparatus 300 is sized to span substantially the entire cross-section of flow path 258 (e.g., apparatus 300 spans from one transition section side panel assembly 230 to the other, and from transition section front panel assembly 226 to transition section rear panel assembly 228). In other embodiments, apparatus 300 may not span substantially the entire cross-section of flow path 258, may have any suitable orientation relative to axis 264, and may have any suitable dimensions (e.g., the length of lateral dimension 260 may be greater than or equal to the length of longitudinal dimension 262 in some embodiments).

In the exemplary embodiment, apparatus 300 has a bracket 302 and a liquid delivery system 304 coupled to bracket 302. Bracket 302 has a substantially rectangular frame 306 that is seated adjacent to, and coupled to at least one of, the respective front panel assembly 214 and 226, rear panel assembly 216 and 228, and side panel assemblies 218 and 230 of plenum section 212 and/or transition section 210. Bracket 302 also has at least one longitudinal beam 308 (e.g., a rearward longitudinal beam 310 and a frontward longitudinal beam 312), and at least one lateral beam 314 (e.g., a first lateral beam 316 and a second lateral beam 318), that extend across frame 306. Although frame 306 is substantially rectangular in the exemplary embodiment, frame 306 may have any suitable shape in other embodiments. Moreover, although bracket 302 has a pair of longitudinal beams 308 and a pair of lateral beams 314 in the exemplary embodiment, bracket 302 may have any suitable number of beams oriented in any suitable manner in other embodiments (e.g., bracket 302 may have no beams in other embodiments).

In the exemplary embodiment, liquid delivery system 304 includes a header assembly 320, at least one conduit 322 coupled to header assembly 320, and at least one nozzle 324 coupled to each conduit 322. Header assembly 320 has at least one header line 326, and each header line 326 is coupled to at least one conduit 322. More specifically, in the exemplary embodiment, a first header line 328 is coupled to a plurality of first conduits 330, a second header line 332 is coupled to a plurality of second conduits 334, and a third header line 336 is coupled to a plurality of third conduits 338. Header assembly 320 is designed for coupling to front panel assembly 226 of transition section 210 and/or front panel assembly 214 of plenum section 212. Conduits 322 are coupled to bracket 302 (e.g., frame 306 and/or longitudinal beams 308) and extend substantially perpendicularly from their respective header lines 326 across flow path 258, such that conduits 322 extend laterally across, and are spaced longitudinally along, frame 306. Although liquid delivery system 304 is illustrated with three header lines 326, ten conduits 322, and three nozzles 324 per conduit 322 in the exemplary embodiment, liquid delivery system 304 may have any suitable number of header lines 326, conduits 322, and nozzles 324 in other embodiments. Moreover, header lines 326 may be coupled to any suitable structure of inlet housing 200, and conduits 322 may have any suitable orientation relative to header lines 326, that facilitates enabling apparatus 300 to function as described herein.

With reference to FIGS. 1 and 5, during operation of turbine assembly 102, working gas 132 flows along axis 264 through spaces 340 defined by the grid-like arrangement of beams 308 and 314, and conduits 322, of apparatus 300. Meanwhile, liquid 150 (e.g., water) is channeled along header line(s) 326 and into conduits 322, and liquid 150 is discharged from nozzles 324 into flow path 258, such that small droplets of liquid 150 become suspended in working gas 132 before working gas 132 is channeled into compressor 108.

On occasion, a component of compressor 108 (e.g., rotor 124 and/or part of casing 122) may need to be removed. However, it can be time consuming and costly to completely disassemble inlet housing 200 in the process, and it is preferable to leave inlet housing 200 at least partially intact. This can be accomplished, with respect to removing rotor 124 for example, by sliding rotor shaft 128 out of inlet housing 200 in a rearward direction 152 after rotor shaft 128 is uncoupled from generator drive shaft 130, thereby withdrawing an end 154 of rotor shaft 128 from duct 204. However, because combustor 110 initially prevents rearward movement of rotor 124, rotor 124 first needs to be lifted in a vertical direction 156 along duct 204 to clear combustor 110 before rotor 124 can be moved rearward to withdraw shaft end 154 from duct 204. To permit lifting shaft 128 along duct 204 in this manner, panels 238, 240, 242, and 244 of duct 204 are detached, and upper part 248 of rotor shaft casing 250 is also detached. Moreover, because it can be difficult to remove the entire apparatus 300 from duct 204 without completely disassembling inlet housing 200, apparatus 300 is designed to permit a component of compressor 108 (e.g., shaft end 154 of rotor 124, and/or part of casing 122) to be lifted past apparatus 300 without having to remove the entire apparatus 300 from duct 204, as set forth in more detail below. Notably, other components of compressor 108 may be removed in a manner similar to that described herein for the removal of rotor 124.

Referring specifically to FIG. 5, in the exemplary embodiment, apparatus 300 has a first panel segment 342, a second panel segment 344, and a third panel segment 346 between first panel segment 342 and second panel segment 344, such that third panel segment 346 is delineated at least in part between first lateral beam 316 and second lateral beam 318. Each lateral beam 314 is coupled to frame 306 via at least one frame joint 347 (e.g., first lateral beam 316 is coupled to frame 306 at a first rearward frame joint 348 and a first frontward frame joint 350, and second lateral beam 318 is coupled to frame 306 at a second rearward frame joint 352 and a second frontward frame joint 354). Each lateral beam 314 is also coupled to each longitudinal beam 308 at a beam joint 356 (e.g., first lateral beam 316 is coupled to frontward longitudinal beam 312 at a first frontward beam joint 358 and is coupled to rearward longitudinal beam 310 at a first rearward beam joint 360, and second lateral beam 318 is coupled to frontward longitudinal beam 312 at a second frontward beam joint 362 and is coupled to rearward longitudinal beam 310 at a second rearward beam joint 364).

In some embodiments, as set forth in more detail below, frame 306 may also have at least one intermediate frontward frame joint 366 longitudinally between frontward frame joints 350 and 354, and at least one intermediate rearward frame joint 368 longitudinally between rearward frame joints 348 and 352. Each longitudinal beam 308 may likewise have at least one intermediate beam joint 370 longitudinally between its respective beam joints 356 (e.g., rearward longitudinal beam 310 may have an intermediate rearward beam joint 372 between first rearward beam joint 360 and second rearward beam joint 364, and frontward longitudinal beam 312 may have an intermediate frontward beam joint 374 between first frontward beam joint 358 and second frontward beam joint 362). Additionally, in some embodiments, each conduit 322 of third panel segment 346 may have an interior conduit joint 376 and/or an exterior conduit joint 378, as set forth in more detail below.

As used herein, the term "interior conduit joint" refers to a conduit joint that is positioned within flow path 258 of duct 204 when apparatus 300 is mounted to duct 204 for operation. On the other hand, as used herein, the term "exterior conduit joint" refers to a conduit joint that is positioned outside of flow path 258 of duct 204 when apparatus 300 is mounted to duct 204 for operation. Moreover, as used herein, the term "separable joint" refers to a joint that enables complete separation of the coupled-together structures (e.g., a bolt joint), and the term "pivotable joint" refers to a joint that enables relative movement of the coupled-together structures (e.g., a ball joint or a hinge joint).

Figure 6:
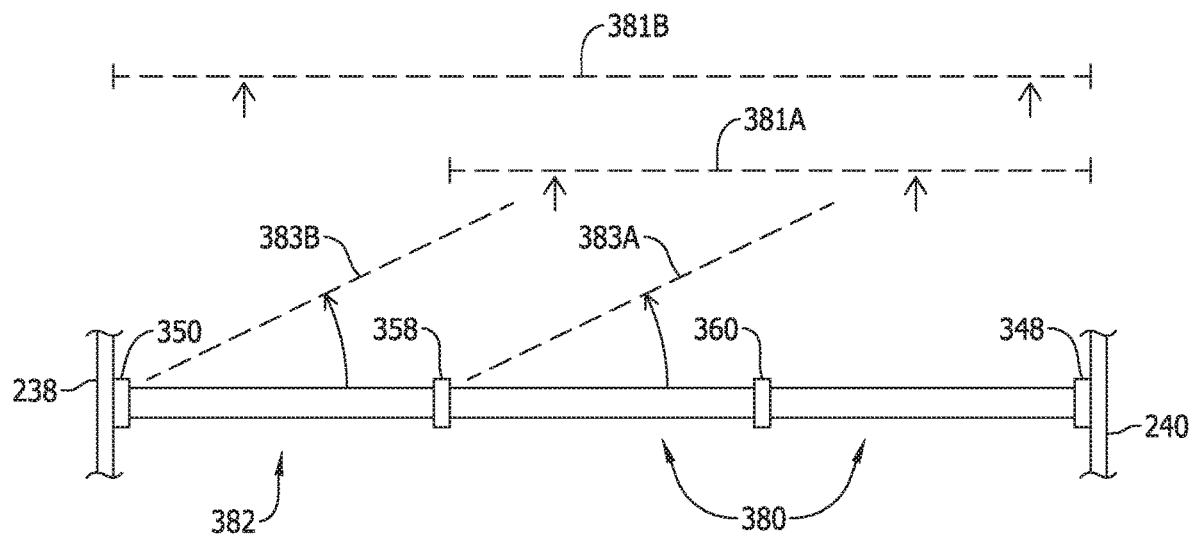
FIG. 6 is a schematic cross-sectional illustration of the liquid injection apparatus shown in FIG. 5 and taken along plane 6-6 of FIG. 5.

In a first exemplary embodiment of apparatus 300, frame 306 does not include intermediate joints 366, 368, 372, and 374. Rearward frame joints 348 and 352, rearward beam joints 360 and 364, and frontward beam joints 358 and 362 are separable joints. Interior conduit joints 376 are also separable joints each having a suitable seal (e.g., an O-ring seal such as, for example, an O-ring face seal fitting) to mitigate leakage of liquid therefrom. As shown in FIG. 6, a rear part 380 of apparatus third panel segment 346 is thus temporarily detachable from apparatus first panel segment 342, apparatus second panel segment 344, and a front part 382 of third panel segment 346 by: (1) separating rearward frame joints 348 and 352, rearward beam joints 360 and 364, and frontward beam joints 358 and 362; (2) separating interior conduit joints 376; (4) axially displacing (or lifting) third panel segment rear part 380 (as indicated by line 381A) relative to first panel segment 342, second panel segment 344, and third panel segment front part 382; and (5) removing third panel segment rear part 380 from flow path 258 via duct front aperture 252 or duct rear aperture 254. A passage (not shown) corresponding to the detached rear part 380 of third panel segment 346 is thereby defined in apparatus 300 to permit lifting a component of compressor 108 (e.g., part of rotor 124 and/or part of casing 122) therethrough. For example, compressor rotor shaft end 154 may be lifted through the passage in apparatus 300 and axially along duct 204 until compressor rotor 124 vertically clears combustor 110. Thus, compressor rotor 124 (and other compressor components) can be lifted vertically past apparatus 300 via the passage without having to remove the entire apparatus 300 from duct 204 (e.g., apparatus first panel segment 342 and apparatus second panel segment 344 do not need to be dismounted from duct 204 in order to lift compressor rotor 124 and/or other compressor components above apparatus 300).

Optionally, in some embodiments, frontward frame joints 350 and 354, and intermediate frontward frame joint 366, may also be separable joints such that third panel segment rear part 380 and third panel segment front part 382 are temporarily detachable from first panel segment 342 and second panel segment 344 by axially displacing (or lifting) rear part 380 and front part 382 together (as indicated by line 381B) to provide a larger passage through apparatus 300. In such embodiments, conduits 322 of third panel segment 346 do not have interior conduit joints 376 in order to further mitigate leakage of liquid into flow path 258, which in turn reduces the risk of oversized liquid droplets being ingested into compressor 108 and, therefore, the likelihood of oxidation occurring on components (e.g., rotor blades 126) of compressor 108. Rather, in such embodiments, exterior conduit joints 378 are separable joints each having a suitable seal (e.g., an O-ring seal such as, for example, an O-ring face seal fitting) to mitigate leakage of liquid therefrom, such that the entire third panel segment 346 (i.e., rear part 380 and front part 382) of apparatus 300 is detachable after separating exterior conduit joints 378.

In a second exemplary embodiment of apparatus 300, frame 306 does not include intermediate joints 366, 368, 372, and 374. Rearward frame joints 348 and 352 are separable joints, rearward beam joints 360 and 364 are separable joints, and frontward beam joints 358 and 362 are pivotable joints. Interior conduit joints 376 are separable joints each having a suitable seal (e.g., an O-ring seal such as, for example, an O-ring face seal fitting) to mitigate leakage of liquid therefrom. As shown in FIG. 6, rear part 380 of apparatus third panel segment 346 is thus temporarily displaceable relative to apparatus first panel segment 342, apparatus second panel segment 344, and front part 382 of third panel segment 346 by: (1) separating rearward frame joints 348 and 352, rearward beam joints 360 and 364, and interior conduit joints 376; and (2) laterally pivoting third panel segment rear part 380 toward third panel segment front part 382 about frontward beam joints 358 and 362 (as indicated by line 383A) to define a passage (not shown) in apparatus 300. Thus, a component of compressor 108 (e.g., part of compressor rotor 124 and/or part of compressor casing 122) can be lifted vertically past apparatus 300 via the passage without having to remove the entire apparatus 300 from duct 204 (e.g., apparatus first panel segment 342 and apparatus second panel segment 344 do not need to be dismounted from duct 204 in order to lift compressor rotor 124 and/or other compressor components above apparatus 300).

Figure 7:
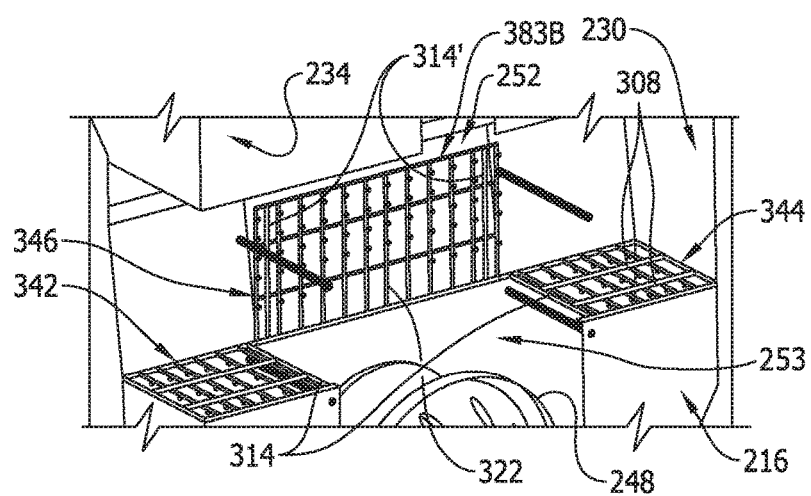
FIG. 7 is a perspective view of an embodiment of the liquid injection apparatus shown in FIG. 6 installed in the inlet housing shown in FIG. 2 with rear and side panels removed from the inlet housing.

In a third exemplary embodiment of apparatus 300, frame 306 does not include intermediate joints 366, 368, 372, and 374, and conduits 322 of apparatus third panel segment 346 do not include interior conduit joints 376 to mitigate leakage of liquid into flow path. Rearward frame joints 348 and 352, rearward beam joints 360 and 364, and frontward beam joints 358 and 362 are separable joints, and frontward frame joints 350 and 354 are pivotable joints. Exterior conduit joints 378 are separable joints each having a suitable seal (e.g., an O-ring seal such as, for example, an O-ring face seal fitting) to mitigate leakage of liquid therefrom. As shown in FIGS. 6 and 7, the entire third panel segment 346 (e.g., rear part 380 and front part 382) of apparatus 300 is temporarily displaceable relative to apparatus first panel segment 342 and apparatus second panel segment 344 by: (1) separating rearward frame joints 348 and 352, rearward beam joints 360 and 364, frontward beam joints 358 and 362, and exterior conduit joints 378; and (2) laterally pivoting rear part 380 and front part 382 of third panel segment 346 together (as indicated by line 383B) about frontward frame joints 350 and 354, and relative to first panel segment 342 and second panel segment 344, to define a passage 253 in apparatus 300. Thus, a component of compressor 108 (e.g., part of compressor rotor 124 and/or part of compressor casing 122) can be lifted vertically past apparatus 300 via passage 253 without having to remove the entire apparatus 300 from duct 204 (e.g., apparatus first panel segment 342 and apparatus second panel segment 344 do not need to be dismounted from duct 204 in order to lift compressor rotor 124 and/or other compressor components above apparatus 300). Notably, FIG. 7 illustrates a pair of additional lateral beams 314' to further facilitate supporting conduits 322 during pivoting.

Figure 8:
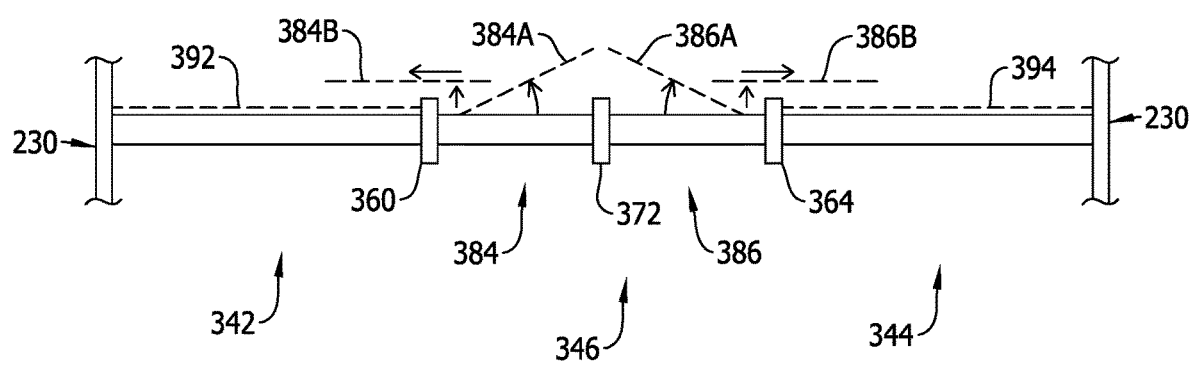
FIG. 8 is a schematic cross-sectional illustration of the liquid injection apparatus shown in FIG. 5 and taken along plane 8-8 of FIG. 5.

In a fourth exemplary embodiment of apparatus 300, conduits 322 of third panel segment 346 do not include interior conduit joints 376 to mitigate leakage of liquid into flow path. Frame joints 348, 350, 352, and 354 are pivotable joints, beam joints 358, 360, 362, and 364 are pivotable joints, and intermediate joints 366, 368, 372, and 374 are separable joints. Exterior conduit joints 378 are separable joints each having a suitable seal (e.g., an O-ring seal such as, for example, an O-ring face seal fitting) to mitigate leakage of liquid therefrom. As shown in FIG. 8, a first part 384 and a second part 386 of apparatus third panel segment 346 are thus temporarily displaceable relative to apparatus first panel segment 342 and apparatus second panel segment 344, respectively, by: (1) separating intermediate joints 366, 368, 372, and 374; (2) separating exterior conduit joints 378; (3) pivoting third panel segment first part 384 longitudinally towards apparatus first panel segment 342 about first frame joints 348 and 350 and first beam joints 358 and 360 (as indicated by line 384A); and (4) pivoting third panel segment second part 386 longitudinally towards apparatus second panel segment 344 about second frame joints 352 and 354 and second beam joints 362 and 364 (as indicated by line 386A). Such displacement of third panel segment first part 384 and third panel segment second part 386 defines a passage through apparatus 300. Thus, a component of compressor 108 (e.g., part of compressor rotor 124 and/or part of compressor casing 122) can be lifted vertically past apparatus 300 via the passage without having to remove the entire apparatus 300 from duct 204 (e.g., apparatus first panel segment 342 and apparatus second panel segment 344 do not need to be dismounted from duct 204 in order to lift compressor rotor 124 and/or other compressor components above apparatus 300). Optionally, in some embodiments, the entire first part 384 and/or the entire second part 386 of apparatus third panel segment 346 is not pivotable but, rather, only a rear region 388 of the respective part 384 and 386 is pivotable, such that a front region 390 of the respective part 384 and 386 does not pivot. For example, in some such embodiments, conduits 322 may have interior conduit joints 376 that are separable joints each with a suitable seal (e.g., an O-ring seal such as, for example, an O-ring face seal fitting), and frontward frame joints 350 and 354 may not be pivotable joints).

In a fifth exemplary embodiment of apparatus 300, conduits 322 do not include interior conduit joints 376 to mitigate leakage of liquid into flow path. Frame joints 348, 350, 352, and 354 are separable joints, beam joints 358, 360, 362, and 364 are separable joints, and intermediate joints 366, 368, 372, and 374 are separable joints. Exterior conduit joints 378 are also separable joints each having a suitable seal (e.g., an O-ring seal such as, for example, an O-ring face seal fitting) to mitigate leakage of liquid therefrom. As shown in FIG. 8, third panel segment first part 384 and third panel segment second part 386 are thereby temporarily displaceable relative to apparatus first panel segment 342 and apparatus second panel segment 344, respectively, by: (1) separating intermediate joints 366, 368, 372, and 374; (2) separating frame joints 348, 350, 352, and 354, and beam joints 358, 360, 362, and 364; (3) separating exterior conduit joints 378; (4) axially displacing (or lifting) third panel segment first part 384 relative to apparatus first panel segment 342, and longitudinally sliding third panel segment first part 384 along at least one first rail 392 of apparatus first panel segment 342 (as indicated by line 384B); and (5) axially displacing (or lifting) third panel segment second part 386 relative to apparatus second panel segment 344, and longitudinally sliding third panel segment second part 386 along at least one second rail 394 of apparatus second panel segment 344 (as indicated by line 386B). Such displacement of third panel segment first part 384 and third panel segment second part 386 defines a passage through apparatus 300. Thus, a component of compressor 108 (e.g., part of compressor rotor 124 and/or part of compressor casing 122) can be lifted vertically past apparatus 300 via the passage without having to remove the entire apparatus 300 from duct 204 (e.g., apparatus first panel segment 342 and apparatus second panel segment 344 do not need to be dismounted from duct 204 in order to lift compressor rotor 124 and/or other compressor components above apparatus 300). Notably, in other embodiments, any suitable part(s) of third panel segment 346 (e.g., the entire third panel segment 346) may be lifted, or lowered, and slid along rail(s) of first panel segment 342 and/or second panel segment 344 in any suitable direction that facilitates lifting a component of compressor 108 through a corresponding passage defined in apparatus 300 as described herein.

Optionally, in some embodiments, apparatus 300 may not include beams 308 and/or 314 that provide support for conduits 322. Rather, apparatus 300 may instead have a self-supporting arrangement of conduits and/or header lines (e.g., conduits 322 and/or header lines 326), and a plurality of conduit joints (e.g., conduit joints 376 and/or 378) which enable the displacement and/or detachment of part(s) of third panel segment 346 in a manner similar to that of the embodiments set forth above.

Figure 9:
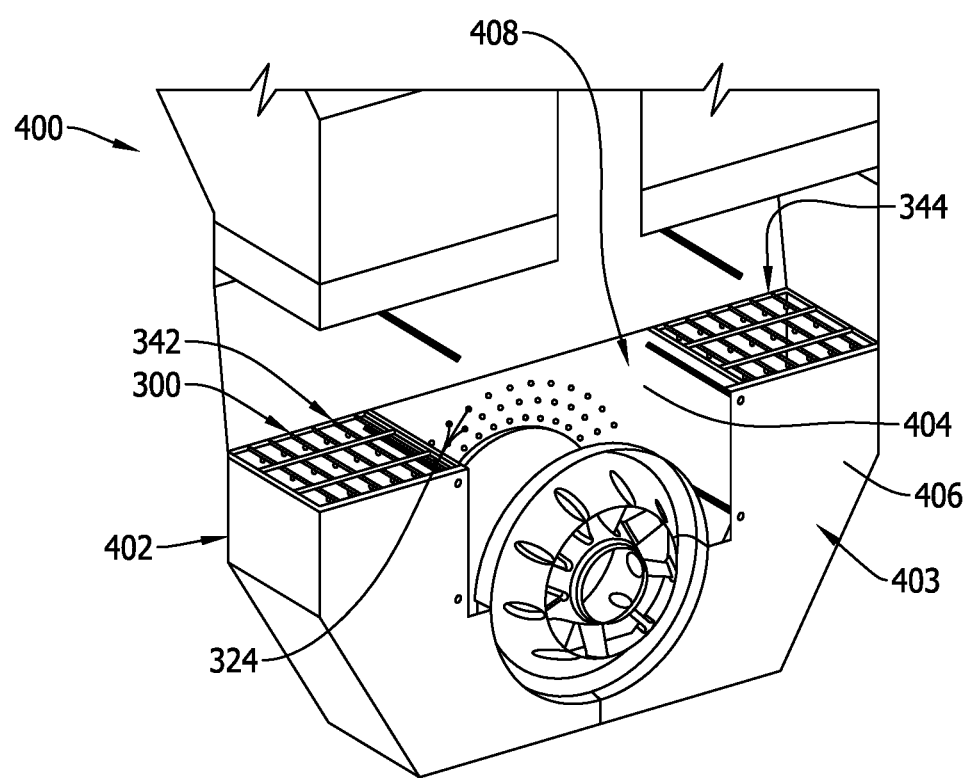
FIG. 9 is a rear perspective view of another exemplary inlet housing for use in the power plant shown in FIG. 1 with rear and side panels removed from the inlet housing.

FIG. 9 illustrates another exemplary compressor inlet housing 400 for use in power plant 100. In the exemplary embodiment, inlet housing 400 includes a duct 402 and an embodiment of apparatus 300 coupled within duct 402. Duct 402 includes a plenum section 403 having a front panel assembly 404 and a rear panel assembly 406. Notably, this embodiment of apparatus 300 does not have third panel segment 346 (shown in FIG. 5) between first panel segment 342 and second panel segment 344, such that a passage 408 is defined between first panel segment 342 and second panel segment 344. Because this embodiment of apparatus 300 is missing third panel segment 346 (and, hence, the nozzles 324 that would have otherwise been provided on third panel segment 346), a plurality of nozzles 324 are instead mounted directly on duct 402 in fluid communication with header line(s) 326 (shown in FIG. 5) (e.g., nozzles 324 may be mounted directly on front panel assembly 404 (as shown in FIG. 9) and/or rear panel assembly 406). In some embodiments, apparatus 300 may have only part of third panel segment 346 (e.g., apparatus 300 may have only front part 382, but not rear part 380, of third panel segment 346), and nozzles 324 that would have otherwise been coupled to the missing part(s) of third panel segment 346 are instead mounted directly on duct 402 in fluid communication with header line(s) 326. In other embodiments, nozzles 324 that would have otherwise been coupled to the missing third panel segment 346, or the missing part(s) thereof, may be coupled to the remaining panel segment(s) 342 and/or 344, such that no nozzles 324 are mounted directly on duct 402. To facilitate selecting the direction at which liquid 150 is injected into the flow path from nozzle(s) 324 in any of the embodiments set forth herein, each such nozzle 324 may be designed such that the orientation (or angle) thereof is adjustable.

Alternatively, apparatus 300 may not include bracket 302 or conduits 322 (shown in FIG. 5), such that apparatus 300 does not span duct 402 but, instead, has all of its nozzles 324 mounted directly on duct 402 (e.g., rather than being coupled to bracket 302 and suspended within duct 402 as shown in FIG. 5, all nozzles 324 of apparatus 300 may instead be arranged in a suitable pattern on front panel assembly 404 and/or rear panel assembly 406). Thus, a component of compressor 108 (e.g., part of compressor rotor 124 and/or part of compressor casing 122) can be lifted vertically past apparatus 300 (via, for example, passage 408) without having to remove the entire apparatus 300 from duct 400.

The methods and systems described herein facilitate providing a liquid injection apparatus for use with a compressor. For example, the methods and systems facilitate providing a liquid injection apparatus that mounts within an inlet flow path of a turbine assembly, while obstructing less of the inlet flow path such that component(s) of the turbine assembly (e.g., component(s) of the compressor such as, for example, the compressor rotor shaft and/or a compressor casing part)

can be moved past the apparatus along the flow path without having to remove the entire apparatus from the flow path. The methods and systems thus facilitate mitigating damage and/or contamination of the apparatus that would have otherwise occurred had the entire apparatus needed to be removed and reinstalled. Moreover, the methods and systems thus facilitate removing and/or servicing other components of the turbine assembly (e.g., component(s) of the compressor such as, for example, the compressor rotor) without having to completely disassemble the inlet housing in which the apparatus is mounted. The methods and systems therefore facilitate reducing the time needed to remove and/or service components of a turbine assembly and, as a result, facilitate reducing the time that the turbine assembly is offline, which in turn reduces the cost associated therewith.

Exemplary embodiments of a liquid injection apparatus are described above in detail. The systems and methods described herein are not limited to the specific embodiments described herein, but rather, components of the systems and methods may be utilized independently and separately from other components described herein. For example, the systems and methods described herein may have other applications not limited to practice with compressors and/or turbine assemblies, as described herein. Rather, the systems and methods described herein can be implemented and utilized in connection with various other industries.

While the invention has been described in terms of various specific embodiments, those skilled in the art will recognize that the invention can be practiced with modification within the spirit and scope of the claims.

What is claimed is:

1. A liquid injection apparatus for use with a compressor having a rotor shaft and a casing part, said liquid injection apparatus comprising at least one conduit and at least one nozzle coupled to said at least one conduit, wherein said liquid injection apparatus is panel-shaped and has a first panel segment, a second panel segment, and
a third panel segment positioned between said first panel segment and said second panel segment, wherein said third panel segment is at least in part detachable from at least one of said first panel segment and said second panel segment for receiving at least one of the rotor shaft and the casing part between said first panel segment and said second panel segment, wherein said third panel segment comprises a first part and a second part, said first part pivotable towards said first panel segment, said second part pivotable towards said second panel segment.

2. A liquid injection apparatus in accordance with claim 1, wherein said third panel segment is at least in part detachable from said first panel segment and said second panel segment.

3. A liquid injection apparatus in accordance with claim 1, wherein said at least one conduit comprises a conduit joint plurality of first conduits in said first panel segment, a plurality of second conduits in said third panel segment, and a plurality of third conduits in said second panel segment.

4. A liquid injection apparatus in accordance with claim 3, wherein said plurality of second conduits comprises a conduit joint.

5. A compressor assembly comprising:
a casing comprising a casing part;
a rotor coupled within said casing, wherein said rotor comprises a rotor shaft; and
an inlet housing coupled to said casing such that said rotor shaft extends into said inlet housing, said inlet housing defines a flow path into said casing and comprises a liquid injection apparatus coupled within said flow path, said liquid injection apparatus comprising at least one conduit and at least one nozzle coupled to said at least one conduit, wherein said liquid injection apparatus is panel-shaped and has a first panel segment, a second panel segment, and
a third panel segment positioned between said first panel segment and said second panel segment, wherein said third panel segment is at least in part detachable from at least one of said first panel segment and said second panel segment for receiving at least one of said rotor shaft and said casing part between said first panel segment and said second panel segment, wherein said third panel segment is at least in part slidable along at least one of said first panel segment and said second panel segment.

6. A compressor assembly in accordance with claim 5, wherein said third panel segment is at least in part detachable from said first panel segment and said second panel segment.

7. A compressor assembly in accordance with claim 5, wherein said at least one conduit comprises a conduit joint plurality of first conduits in said first panel segment, a plurality of second conduits in said third panel segment, and a plurality of third conduits in said second panel segment.

8. A compressor assembly in accordance with claim 7, wherein said plurality of second conduits comprises a conduit joint.

9. A compressor assembly in accordance with claim 5, wherein said liquid injection apparatus comprises a bracket to which said at least one conduit is coupled, said bracket comprising a frame and at least one beam extending across said frame.

10. A compressor assembly in accordance with claim 9, wherein at least one of:
said at least one beam comprises a first beam, a second beam, and a pivotable joint that couples said first beam to said second beam; and
said bracket comprises a pivotable joint that couples said at least one beam to said frame.

11. A compressor assembly in accordance with claim 5, wherein said at least one conduit does not comprise a joint positioned within said flow path.

* * * * *